Oct. 15, 1946.   W. H. DE LANCEY   2,409,477
FLUID SUPPLY APPARATUS FOR BURNERS
Original Filed Sept. 16, 1944   5 Sheets-Sheet 1

INVENTOR
WARREN H. DE LANCEY
BY Chapin + Neal
ATTORNEYS

Oct. 15, 1946.  W. H. DE LANCEY  2,409,477
FLUID SUPPLY APPARATUS FOR BURNERS
Original Filed Sept. 16, 1944  5 Sheets-Sheet 2
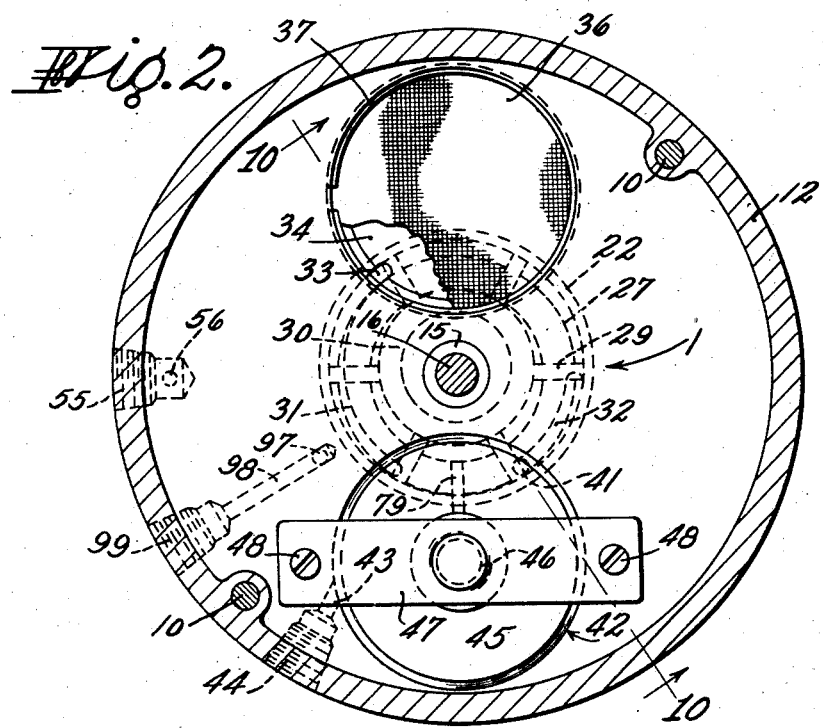
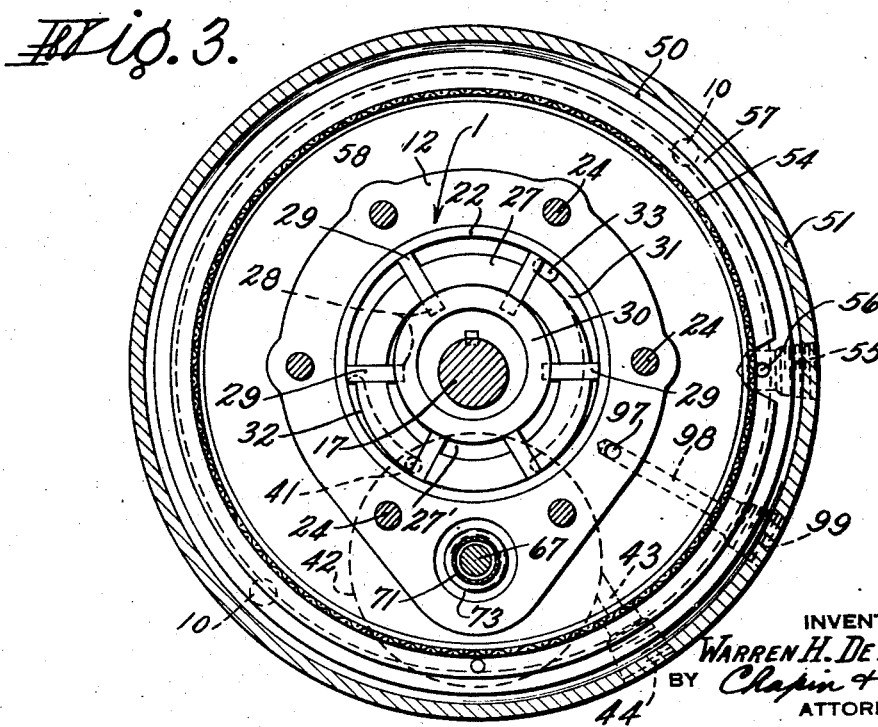
INVENTOR
WARREN H. DE LANCEY
BY Chapin & Neal
ATTORNEYS Oct. 15, 1946.  W. H. DE LANCEY  2,409,477
FLUID SUPPLY APPARATUS FOR BURNERS
Original Filed Sept. 16, 1944  5 Sheets-Sheet 3

INVENTOR
WARREN H. DE LANCEY
BY Chapin & Neal
ATTORNEYS

Oct. 15, 1946.  W. H. DE LANCEY  2,409,477
FLUID SUPPLY APPARATUS FOR BURNERS
Original Filed Sept. 16, 1944  5 Sheets-Sheet 4

INVENTOR
WARREN H. DE LANCEY
BY Chapin & Neal
ATTORNEYS

Oct. 15, 1946.  W. H. DE LANCEY  2,409,477
FLUID SUPPLY APPARATUS FOR BURNERS
Original Filed Sept. 16, 1944   5 Sheets-Sheet 5
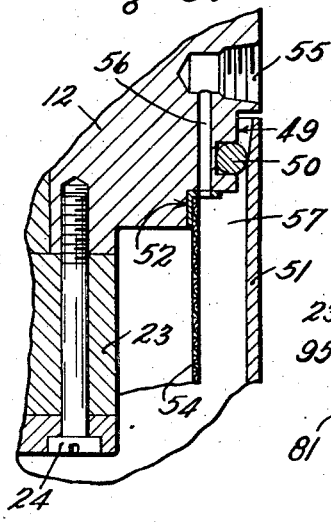
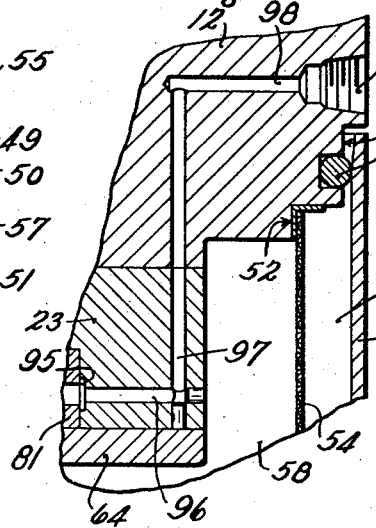
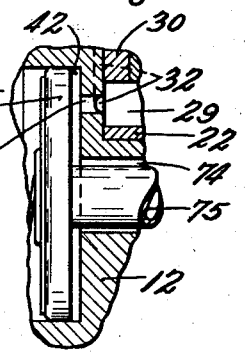
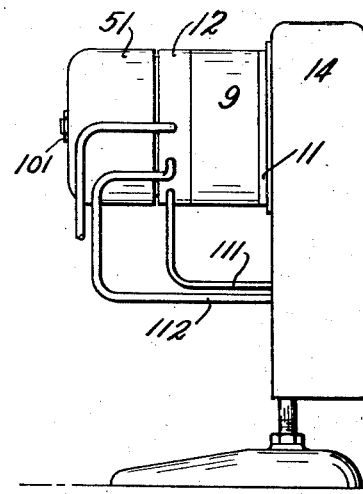
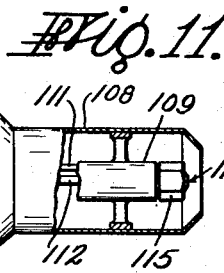
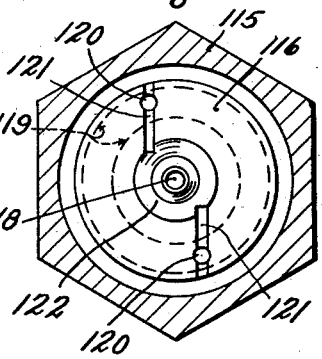
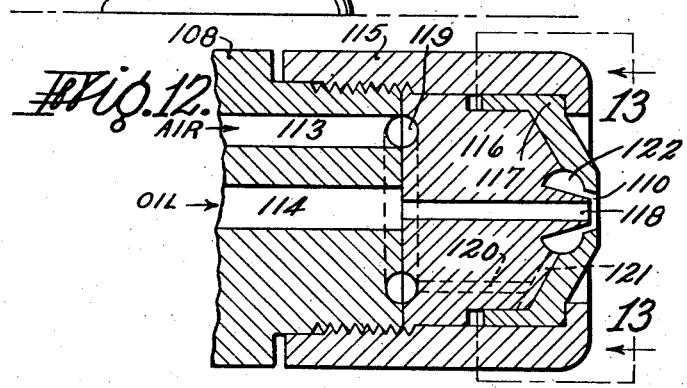
INVENTOR
WARREN H. DE LANCEY
BY Chapin & Neal
ATTORNEYS Patented Oct. 15, 1946

2,409,477

UNITED STATES PATENT OFFICE 2,409,477

FLUID SUPPLY APPARATUS FOR BURNERS

Warren H. De Lancey, Springfield, Mass., assignor to Gilbert & Barker Manufacturing Company, West Springfield, Mass., a corporation of Massachusetts Original application September 16, 1944, Serial No. 554,367. Divided and this application August 30, 1945, Serial No. 613,683

3 Claims. (Cl. 103—6)

This invention relates to improvements in apparatus for supplying fluids, such as air and oil, to an oil burner, such for example as an air-atomizing burner to which both primary and secondary air must be supplied as well as fuel.

This application is a division of my application Serial No. 554,367, filed September 16, 1944.

The invention, while capable of other applications, is primarily designed to supply small-size burners, such for example as those used with hot water heaters, where oil is consumed at very low rates, say from one-twentieth to three-quarters of a gallon per hour. Oil at such low rates cannot be handled properly by the so-called pressure atomizer usually used in gun type burners and it is necessary to resort to the so-called air-atomizing nozzle. This invention provides the means for supplying the air for such nozzle at regulated pressure and also for supplying the oil at any selected rate over a range, such as that above set forth, with an arrangement whereby the oil pumping rate may be readily and conveniently varied while the oil pump is in operation.

The invention has for one object the provision of an oil-supplying means, together with a cut-off valve; an air pump of the positive displacement type, having a by-pass and a valve controlling the same; and means actuated by pressure of the pumped air for opening the oil valve when the pumped air reaches a predetermined pressure and subsequently opening the by-pass valve when said pressure is exceeded.

The invention has for another object the provision in a single unit of an air pump, an oil pump with means for varying its capacity, an air-pressure-control valve, and an oil cut-off valve actuated by the air-pressure-control valve.

The invention has for another object to provide an electrically driven apparatus of the class described, mounted in the casing of the driving motor and including a fan for supplying primary air to the burner as well as positive displacement pumps, one for supplying the secondary air and one for supplying oil to the burner, together with the necessary control valves and accessories for said pumps.

The invention will be disclosed with reference to the accompanying drawings, in which—

Fig. 1 is a sectional elevational view of the complete apparatus for supplying air and oil to an oil burner;

Figs. 2, 3 and 4 are cross sectional views taken on the lines 2—2, 3—3 and 4—4, respectively, of Fig 1;

Figure 4:
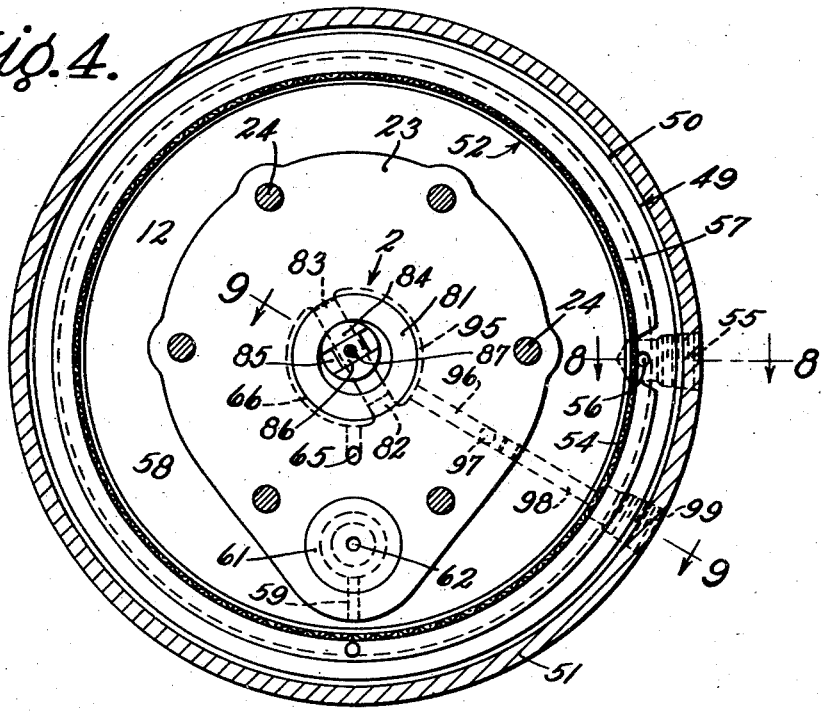
Figure 5:
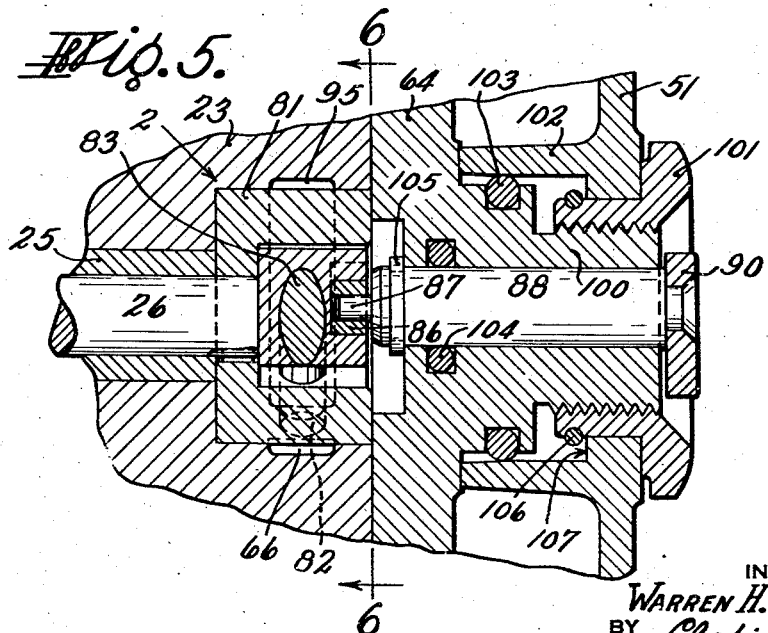
Fig. 5 is a fragmentary sectional elevational view of the oil pump shown in Fig. 1 but drawn to a larger scale.

Figs. 8 and 9 are fragmentary sectional views taken on the lines 8—8 and 9—9, respectively, of Fig. 4;

Fig. 10 is a fragmentary sectional view taken on the line 10—10 of Fig. 2;

Fig. 11 is a small scale elevational view, showing in more or less conventional form, the air and oil supply apparatus mounted on an oil burner;

Fig. 12 is a much enlarged sectional elevational view of the atomizing nozzle of the burner; and Fig. 13 is a much enlarged cross sectional view taken on the line 13—13 of Fig. 12.

Figure 1:
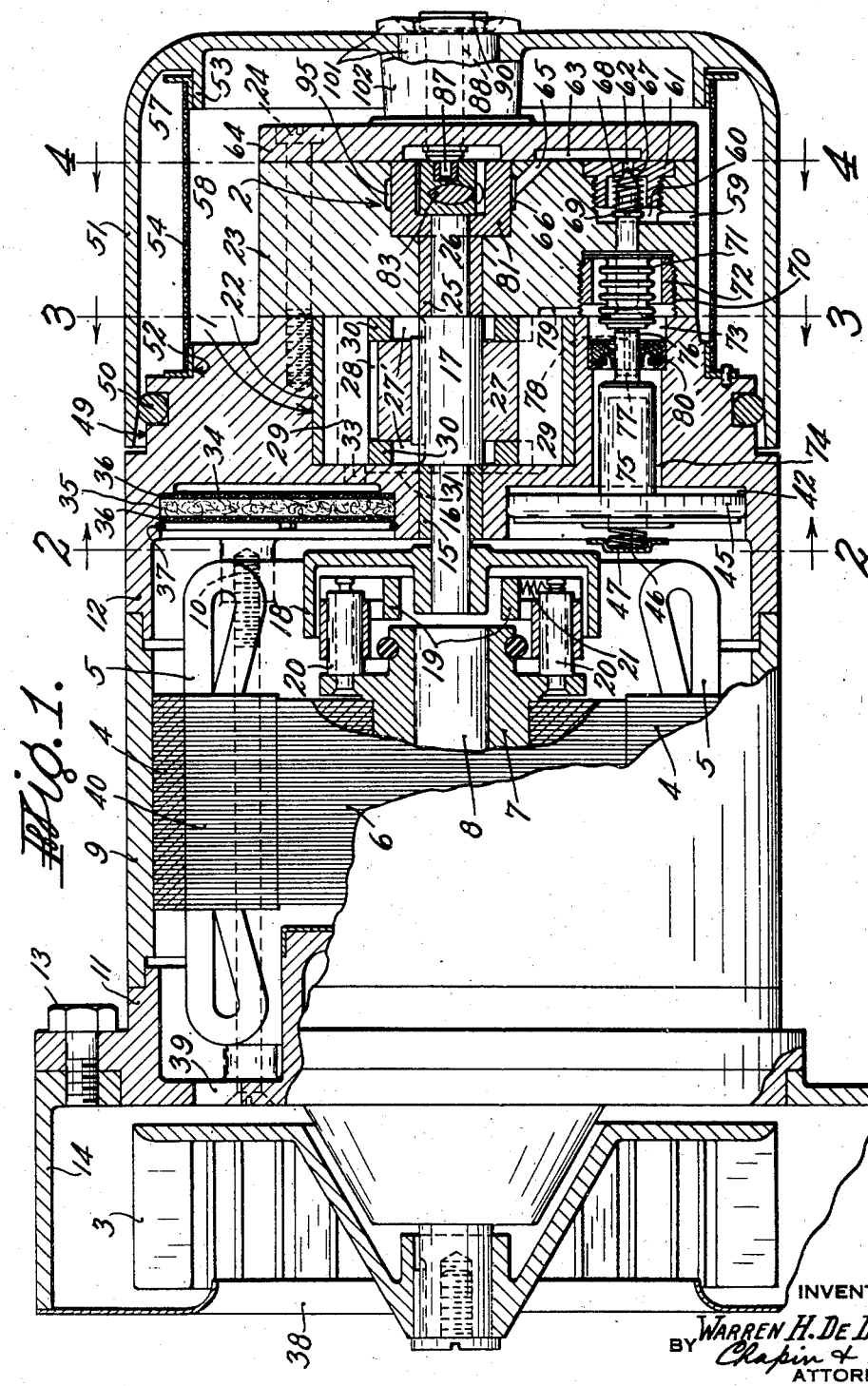

Referring to these drawings and first to Fig. 1 thereof, the apparatus includes a positively-acting displacement pump 1 for supplying primary air to the burner, a variable-capacity positively-acting displacement pump 2 for supplying oil to the burner and a fan 3 for supplying secondary air to the burner. Both pumps 1 and 2 and the fan 3 are driven by an electric motor, of which the stator laminations are indicated at 4, the stator winding at 5, the rotor laminations at 6, the rotor spindle at 7, as fixed to laminations 6, and the rotor shaft at 8 as fixed to the spindle 7. The motor has a cylindrical casing 9 to which are suitably fixed, as by the bolts 10 (Figs. 1 and 2), inner and outer end plates 11 and 12, respectively. The inner end plate 11 is secured, as by cap screws 13, to the fan housing 14 of the oil burner. The end plate 11 rotatably supports in any suitable way the motor shaft 8 and on one end of the latter the fan 3 is fixed, as indicated.

The end member 12 serves to support both pumps 1 and 2, the air filter, the air-pump by-pass valve, the oil valve and all the necessary passages and conduits which are associated with these elements. The member 12 has a sleeve bearing 15, located coaxially thereof and rotatably supporting the inner end 16 of the air pump driving shaft 17. The shaft end 16 extends through member 12 and has its inner end suitably coupled to the motor shaft.

As indicated herein, the coupling is of the speed-responsive type, having a drum 18 fixed to shaft end 16; and a pair of weight segments 19, each pivoted on a stud 20, fixed to a flange of spindle 7. The weights are drawn inwardly by springs 21 and held thereby out of contact with the inner periphery of drum 18. When the motor attains a predetermined speed, the segments 19 will be thrown outwardly by centrifugal force to engage the inner periphery of drum 18 and drive the same and shaft 17. The speed-responsive coupling has been indicated merely in conventional form herein. It may be of any suitable and well known form. One suitable form is shown in my Patent No. 2,364,132, granted December 5, 1944.

The air pump is best shown in Figs. 1 and 3. A deep cylindrical recess is formed in the outer face of end member 12 to receive a sleeve 22 which forms the liner for the pump chamber and which is cylindrical but located eccentrically of the pump shaft 17. The outer end of the pump chamber is closed by a member 23 secured to member 12 by a plurality of cap screws 24. This member 23 has a sleeve bearing 25 for the outer end 26 of shaft 17. The pump rotor 27 is cylindrical with a circular series of angularly-spaced and longitudinally-disposed slots 28 in its periphery to receive one in each, blades 29, which are radially slidable in the slots and the outer edges of which engage the inner peripheral wall of member 22. The ends of the blades and the ends of the rotor engage the end walls of the pump chamber. The end faces of the rotor 27 have cylindrical recesses 27', one in each, to receive rings 30. The ends of each blade 29 rest on the outer peripheral surfaces of these rings and are thereby held with the outer edge of each in contact with the inner peripheral surface of member 22. Inlet and outlet ports 31 and 32, respectively, are formed as arcuate grooves in the inner end wall of the pump chamber formed by member 12. Air enters the spaces between pairs of successive blades from port 31 and is carried in a counterclockwise direction as viewed in Fig. 3 and discharged into the port 32. This particular pump construction is one which is old and well known in the art. Further description of it is therefore deemed unnecessary. The particular form of pump illustrated is not essential to the invention and is given merely by way of illustrative example of one of many types of displacement pumps suitable for the purpose.

Air is admitted to port 31 by means of a passage 33 in end member 12. This passage connects with one end of a cylindrical recess 34 formed in the inner face of member 12. Closely fitted into this chamber is a suitable filter, herein shown as a felt 35 mounted between two wire screens 36. This filter is held in place by a snap ring 37, engaged in a groove in the peripheral wall of recess 34, or in any other suitable way. Air reaches the filter from the air inlet 38 of the fan housing 14, through holes, such as 39, in end member 11 and some of the unused slots, such as 40, in the stator laminations, as will be clear from Fig. 1.

The air pump outlet port 32 is connected by a passage 41 (Fig. 10) to the inner end of a cylinder 42 which is formed in the inner face of end member 12 as best shown in Fig. 1. Also connected with the inner end of cylinder 42 is a passage 43 (Fig. 2) which connects with a tapped hole 44, adapted to be connected to the air inlet of the air-atomizing nozzle of the oil burner. Slidably mounted in cylinder 42 is a piston 45, yieldingly held in the illustrated and extreme inner position by means of a spring 46. This spring has a seat in the center of a cross bar 47 which diametrically spans the outer end of cylinder 42 and is secured at its ends, as by screws 48, to member 12. The spring 46, acting between bar 47 and piston 45, holds the piston in the extreme inner position shown leaving a space with which both of the passages 41 and 42 are constantly in communication.

The piston 45 is movable to the left (as viewed in Fig. 1) when the air pump has built up sufficient pressure to properly atomize the oil. This piston operates an air by-pass valve and an oil inlet valve as will later be described in detail.

The end member 12 has a circular flange 49, grooved to receive a packing ring 50 of rubber or the like. A cup-shaped, pressed-metal cover 51 has its inner end partially telescoping flange 49 and its inner periphery engaged by ring 50 to close liquid-tight the joint between the cover and member 12. The cover is fastened in a manner later to be described. This member and the cover have flanges 52 and 53, respectively, to support a filter screen 54, which encompasses the oil pump 2. The end member 12 (Fig. 8) has a tapped hole 55 adapted for pipe connection to an oil supply tank. This tapped hole is connected by a passage 56 to the annular space 57 between the cover 51 and screen 54. Within the screen lies the oil pump surrounded by an oil chamber 58.

The oil pump has a valve-controlled inlet passage best shown in Fig. 1. A radial passage 59 leads from the lower part of chamber 58 radially upward into the inner end of a cylindrical recess 60 formed in the oil-pump-housing member 23, above described. Threaded into and closing the outer end of this recess is a hollow bushing 61, having a central oil inlet opening 62. The latter communicates with one end of a radial groove 63 formed in the inner face of an end plate 64, which is secured with member 23 to member 12 by the cap screws 24, above described. The other end of groove 63 communicates with a slanting passage 65 in member 23 leading to the pump inlet port 66.

A needle valve 67 controls the oil passage 62. A spring 68, coiled around the stem of this valve, acts between bushing 61 and a snap ring 69, mounted in a groove in the stem, tending to open the valve. The latter is initially held closed against the force of spring 68 by the described piston 45. Formed in the inner end face of housing member 23 is a tapped hole 70. Set into this hole is a bellows 71, the flange of which is clamped to the base of hole 70 by an annular nut 72. The stem of valve 67 extends into the interior of bellows 71 and engages the closed end wall of the same. Leakage of oil around the stem of valve 67 is prevented by the bellows. Formed in the member 12 coaxially of valve 67 and communicating with chamber 70 is a passage 73 and a slightly smaller passage 74. The described piston 45 has a stem portion 75 which is of large diameter and hollow to receive the piston spring 46 and a smaller portion 76 which bears on the end wall of bellows 71 and holds the oil valve closed. As soon as the air pump has built up sufficient pressure, the piston 45 will be moved by the pressure of the pumped air, moving stem 75—76 to the left as viewed in Fig. 1 and allowing oil valve 67 to open. When the piston has been moved to the left as far as possible, the end of stem portion 76 will have drawn away from the end of bellows 71. Movement of the oil valve and the bellows is limited by the abutment of snap ring 69 with the inner end of chamber 70. The piston 45 can move a greater distance (until it abuts cross bar 47) as will be clear from Fig. 1.

The by-pass for the air pump consists of the passage 74 at all times in communication with the cylinder 42 and thus with the pressure side of the air pump; a diametrical hole 77 in the portion 76 of the stem of piston 45; an axial hole 78 in the portion 76; the passage 73; the chamber 70 and a groove 79 in the inner end face of member 23, which groove opens into the chamber of the air pump. The stem portion 76 acts as a valve to control this by-pass, its end face when engaged with the bellows, closing hole 78. A suitable seal 80, pressed into the hole 73 and seated against the shoulder formed at the intersection of holes 73 and 74, slidably receives stem portion 76 and prevents communication between holes 73 and 74 except by way of holes 77 and 78. It will be clear that when the pump has built up sufficient air pressure, the by-pass will open and enable excess air to merely circulate idly through the pump. The air pump has a capacity in excess of its requirements. That is, the one pump must have a capacity large enough to supply burners of widely varying sizes and thus a by-pass is necessary to take care of air not needed for the burner.

Figure 6:
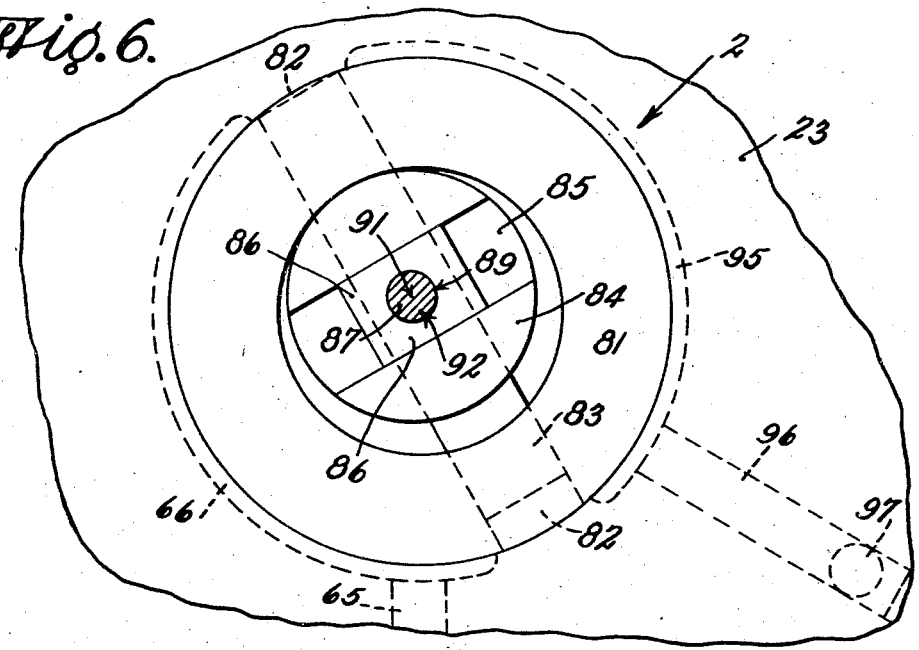
Fig. 6 is an enlarged cross sectional view taken on the line 6—6 of Fig. 5.
Figure 7:
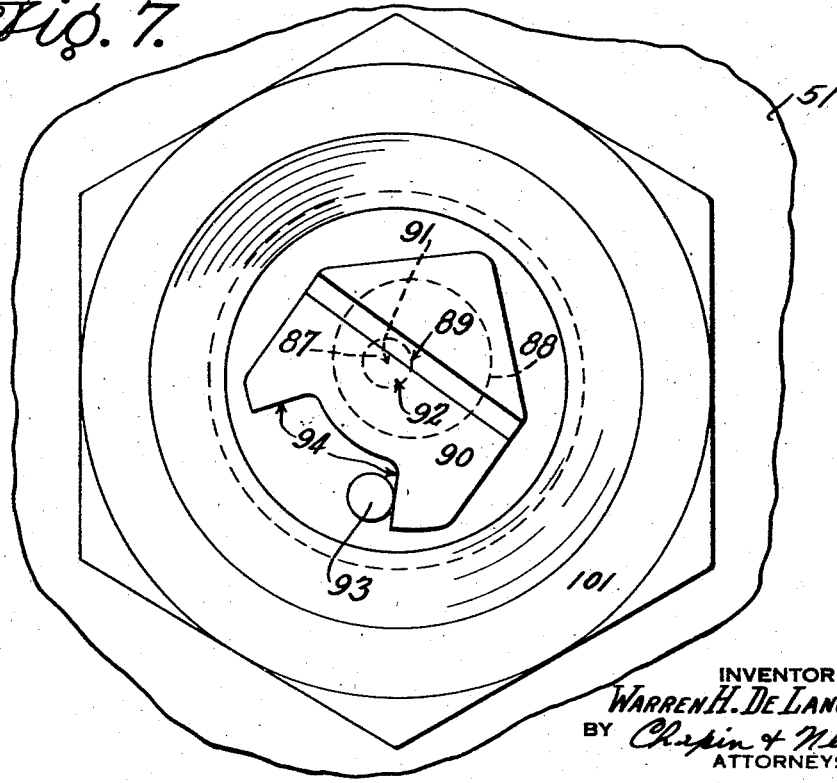
Fig. 7 is an enlarged fragmentary end view taken from the right hand of Fig. 5.

The oil pump includes a cup-shaped rotor 81, the end wall of which is fixed to the portion 26 of the pump drive shaft. This rotor is mounted in and coaxially of a cylindrical chamber formed in housing member 23 and closed by end plate 64. A hole extends diametrically through the annular wall of the rotor, forming two cylinders 82. A single rod 83 extends diametrically of the rotor and is slidably engaged as a piston in each cylinder 82. Fixed to the rod 83 at a location centrally between its ends is a cylindrical member 84 which lies within the open, cup-like end of the rotor and may, by adjustment, be positioned eccentrically or coaxially of the rotor. In the outer end face of the member 84 is a diametrical slot 85 which slidably receives a square block 86. Engaged in this block is a round pin 87 which is fixed eccentrically of and on the inner end of a stem 88. In Fig. 6, 89 indicates the axis of rotation of stem 88. By turning the stem counterclockwise as viewed in Figs. 6 and 7 by means of the handle 90 provided on the stem, the axis of pin 87 may be moved from its position of maximum eccentricity shown in Fig. 6 until its axis 91 coincides with the axis 92 of the pump rotor 81. Thus, the capacity of the pump may be varied from a maximum to zero by increments as small as desired. A stop pin 93 (Fig. 7) limits the movement of handle 90 by abutment with shoulders 94 on the handle to the limits described. As the rotor 81 rotates counterclockwise as viewed in Fig. 6, the outer end of one of the cylinders 82 (the upper one) will communicate with the pump inlet port 66. This is an arcuate groove which is formed in member 23 in encompassing relation with the pump rotor 81. As the rotor turns the upper cylinder 82 draws out from its piston, creating a partial vacuum to draw in oil and fill the cylinder. Meanwhile, the other cylinder which had previously been filled, is brought into communication with the outlet port 95, which is formed similarly to port 66 but on the opposite side of the rotor. As the rotor turns, the lower cylinder moves in on its piston to force out the oil into the outlet port 95.

The outlet port 95 is connected by a radial passage 96 (Fig. 9) to one end of a passage 97 which extends longitudinally through member 23 and a substantial distance into end plate 12 where it connects with a radial passage 98, leading to a tapped hole 99 in plate 12. This hole 99 is adapted to receive the oil pipe leading to the nozzle of the oil burner.

The described adjusting stem 88 of the oil pump is rotatably mounted in a centrally disposed hub 100 on the end plate 64 of the oil pump 2. The outer end of this hub is threaded to receive a flanged annular nut 101 which serves to hold the described cover 51 in place. The cover has an interior hollow hub 102 which encompasses the hub 100 and which is drawn tightly against the outer end face of end plate 64 by nut 101 to avoid leakage from chamber 58. The inner portion of hub 100 has an annular groove to receive a packing ring 103 of rubber or the like to still further prevent leakage from the chamber. The hub 100 has an internal groove to receive a smaller packing ring 104 of rubber or the like which tightly engages stem 88 to prevent leakage of oil along the stem. This stem 88 is held against axial displacement by the handle 90 engaging the outer end face of hub 100 and by a snap ring 105, mounted in a groove in stem 88, engaging the inner end face of the hub. The described stop pin 93 is fixed in the outer end of hub 100.

The nut 101 in its inner end has a circumferential groove in which is fixed a snap ring 106. The purpose of this ring is to enable the cover 51, which sticks tightly in place because of the packing rings 50 and 103, to be positively pulled off when nut 101 is unscrewed, the snap ring abutting the shoulder 107 on the cover for this purpose. This avoids the necessity for the use of prying tools, such as screw drivers or chisels, and the possible damage incident to their use.

In the use of the invention in connection with an oil burner of the air-atomizing type, the fan 3 supplies air from its housing 14 into one end of a tube 108 (Fig. 11), in the outlet of which is arranged a body 109, carrying the nozzle 110. The air and oil discharge ports 44 and 99 of the supply unit are respectively connected by pipes 111 and 112 to passages 113 and 114 (Fig. 12) in the body 109. Fastened to the forward end of the body 109 as by a cap 115, screwed on to the body, is a nozzle body 116, having a frusto-conical outer end and a member 117, having a complementary shaped part to engage said end and having the nozzle orifice 110. The nozzle body 116 has a central oil discharge passage 118 communicating directly with passage 114. Formed between the abutting end of the bodies 108 and 116 is an annular passage 119, receiving air from passage 113 and discharging it through two longitudinal passages 120 in body 116. The passages 116 connect one with each of two slots 121 (Fig. 13), the inner ends of which open tangentially into a whirl chamber 122, formed between the mating frusto-conical parts 116 and 117 (Fig. 12) and surrounding the frusto-conical end of the oil nozzle. Air entering through slots 121 is whirled around in chamber 122 and issues from nozzle 120 in a whirling stream, surrounding the oil stream.

In operation, on a call for heat from the burner, the electric motor is started in any suitable way, usually automatically in response to a thermostat. The fan 3 is driven with the motor and is first brought well up towards its maximum speed before the speed-responsive coupling operates to connect the pump and motor shafts 17 and 8 and drive the oil and air pumps 2 and 1, respectively. This allows time for the scavenging of the air tube 108, the combustion chamber to which it delivers, and the several passes and flues of the heating apparatus. Secondary air, at a sufficient rate to secure good combustion, is available at the burner nozzle before the pumps 1 and 2 are started. Even then actuation of the oil pump 2 is ineffective until the air-pump 1 has first built up the necessary pressure to insure a supply of primary air at the necessary rate to the atomizing nozzle. Then, the oil valve 67 opens to allow flow of oil to the nozzle. On stopping of the burner, the electric motor is deenergized and, after its speed diminishes to a certain point, the speed-responsive coupling disconnects pumps 1 and 2, whereby the oil flow will be quickly cut off by the drop in pressure of the primary air. The flow of oil to the burner nozzle is thus stopped ahead of the flow of primary air to avoid poor combustion. The fan 3 continues in operation after both pumps 1 and 2 have stopped in order to scavenge the burner.

It will be noted that the size of the air passages in the atomizing nozzle will determine the rate of air flow when the predetermined pressure of air has been established by the pump 1. Then, and only then will flow of oil to the burner be permitted. The oil rate is conveniently regulable, even while the pump is in operation, by means of the member 90. The latter is located outside the casing 51 which encloses all the rest of the apparatus and may be turned by as small increments as may be desired to vary the capacity of the oil pump from zero to the selected maximum.

The invention provides a compact arrangement of parts enabling both pumps together with the necessary valves, a screen, a filter, controls and conduits to be provided on the end plate of the driving motor within a casing, forming an oil supply chamber. The arrangement of the chambers 34 and 42, either or both, in one side of the end plate or body member 12 and the air-pump chamber in the other side of the member is thought to be important. The filter and air pressure chambers 34 and 42 are arranged on opposite sides of the bearing 15 and in closely adjacent relation therewith. These chambers 34 and 42 have end walls which each overlap in part the air-pump chamber and the passages 33 and 41 are provided through the overlapping portions of the adjacent end walls of the chambers. The filter and pressure chambers lie between the same two transverse planes. One of these planes coincides with a plane in which one end of bearing 15 is located and the other of which lies between the two planes in which the ends of bearing 15 are located. The inlet and outlet passages 31 and 41 of the air pump may thus be made very short and straight. The by-pass for the air pump is also made as short as possible by extending it along, and closely adjacent, the periphery of the air pump 1 from the pressure chamber 42 to the more remote end wall of the air pump. Also, both the air by-pass valve 78 and oil cut-off valve 67 are located in coaxial relation with the movable wall or piston 45 of the pressure control device. Radially, all parts are kept within reasonably small limits in view of the provision of two pumps and two control valves and the rate-varying-means for the oil pump.

I claim:

1. Apparatus for supplying air and oil to a burner, comprising, a positively-acting displacement pump for supplying air, inlet and discharge conduits for said pump including in the discharge conduit, a chamber, a wall in said chamber movable by pressure of the pumped air, a pump for supplying oil, a cut-off valve preventing flow of oil to the oil pump, a by-pass from the pressure to the suction side of the air pump, a valve controlling said by-pass, and means actuated by said movable wall for opening said cut-off valve when a predetermined air pressure has been built up in said chamber and for subsequently opening the by-pass valve when the pressure in said chamber exceeds said predetermined pressure.

2. Apparatus for supplying air and oil to a burner, comprising, a positively-acting displacement pump for supplying air, inlet and discharge conduits for said pump including in the discharge conduit, a chamber, a wall in said chamber movable by pressure of the pumped air, a variable-capacity positively-acting displacement pump for supplying oil, inlet and discharge conduits for the oil pump, a cut-off valve associated with one of the oil conduits, a by-pass from the pressure to the suction side of the air pump, a valve controlling said by-pass, and means actuated by said movable wall for opening said cut-off valve when a predetermined air pressure has been built up in said chamber and for subsequently opening the by-pass valve when the pressure in said chamber exceeds said predetermined pressure.

3. In apparatus of the class described, a body member having in one end a cylindrical air-pump chamber and in the other end a coaxial bearing, said body member including a part for closing said chamber and having therein a cylindrical oil-pump chamber, a pump rotor in each said chamber, a shaft mounted in said bearing and driving both rotors, said member having between the second end and the air-pump chamber a cylindrical pressure chamber having an end wall in parallel partially-overlapping and in closely adjacent relation with the adjacent wall of the air-pump chamber, a movable wall in the pressure chamber, said member having a conduit interconnecting the overlapping portions of said adjacent end walls, an outlet from the pressure chamber and a by-pass extending from the pressure chamber along and closely adjacent the peripheral wall of the air-pump chamber and entering the latter through its other end wall, an oil conduit connected with the oil-pump chamber, a valve in the oil conduit, and a valve in said by-pass, both said valves located coaxially of said pressure chamber and connected to said movable wall to be actuated thereby.

WARREN H. DE LANCEY.